United States Patent
Sogo et al.

(10) Patent No.: US 7,330,570 B2
(45) Date of Patent: Feb. 12, 2008

(54) FACE COLLATION APPARATUS AND BIOMETRICS DATA COLLATION APPARATUS

(75) Inventors: Koji Sogo, Otsu (JP); Mihoko Takahashi, Ritto (JP); Takuya Kuroda, Otsu (JP)

(73) Assignee: Omron Corporation, Kyoto (JP)

( * ) Notice: Subject to any disclaimer, the term of this patent is extended or adjusted under 35 U.S.C. 154(b) by 698 days.

(21) Appl. No.: 10/444,978

(22) Filed: May 27, 2003

(65) Prior Publication Data

US 2004/0008873 A1    Jan. 15, 2004

(30) Foreign Application Priority Data

May 24, 2002   (JP)   ............... 2002-149995

(51) Int. Cl.
| | |
|---|---|
| G06K 9/00 | (2006.01) |
| G06K 9/46 | (2006.01) |
| G06K 9/62 | (2006.01) |
| H04K 1/00 | (2006.01) |
| G05B 19/00 | (2006.01) |
| H04B 1/00 | (2006.01) |

(52) U.S. Cl. .................. 382/115; 382/190; 382/209; 382/224; 713/182; 340/5.52; 340/5.8

(58) Field of Classification Search ........ 382/115–125, 382/181, 190–206, 209, 224–227; 713/182–186; 340/5.52–5.54, 5.8–5.83
See application file for complete search history.

(56) References Cited

U.S. PATENT DOCUMENTS 5,280,527 A * 1/1994 Gullman et al. ............ 713/184
5,386,104 A * 1/1995 Sime ........................ 340/5.52
5,450,504 A * 9/1995 Calia ........................ 382/118

(Continued)

OTHER PUBLICATIONS

Gordon, Gaile G.: Face recognition from frontal and profile views. In: Bichsel, Martin (ed): International Workshop on Automatic Face- and Gesture-Recognition. Proceedings. Jun. 26-28, 1995, Zurich, Switzerland. (International Conference on Automatic Face and Gesture Recognition; 1) Zürich : MultiMedia Lab. Univ. Zürich (1995)—pp. 47-52.*

Primary Examiner—Bhavesh M Mehta
Assistant Examiner—Manav Seth
(74) Attorney, Agent, or Firm—Dickstein Shapiro LLP (57) ABSTRACT

The invention provides a highly-reliable face collation apparatus and biometrics data collation apparatus in both of which when a person is to be identified, even at the time of a collation in which characteristic data on the person approximates to characteristic data on one of the other persons, the characteristic data are comprehensively collated by combination, whereby the person and the other person can be clearly discriminated from each other to reduce collation errors. The face collation apparatus includes a face image acquiring unit for acquiring face images, a storage unit in which a plurality of different face images on each of persons who are collation targets are stored in advance in such a manner as to be associated with each of the persons, a calculating unit for calculating collation degree data obtained by comparing the acquired face images with the stored face images, an extracting unit for extracting face images of high collation degrees by a predetermined number from among the calculated collation degree data, and an identifying unit for identifying a person when all face images of the person are contained in results extracted by the extracting unit.

13 Claims, 6 Drawing Sheets

U.S. PATENT DOCUMENTS

| | | | |
|---|---|---|---|
| 5,715,325 A * | 2/1998 | Bang et al. | 382/118 |
| 5,852,669 A * | 12/1998 | Eleftheriadis et al. | 382/118 |
| 5,991,429 A * | 11/1999 | Coffin et al. | 382/118 |
| 6,038,333 A * | 3/2000 | Wang | 382/118 |
| 6,084,977 A * | 7/2000 | Borza | 382/124 |
| 6,107,935 A * | 8/2000 | Comerford et al. | 340/5.52 |
| 6,160,903 A * | 12/2000 | Hamid et al. | 382/115 |
| 6,411,728 B1 * | 6/2002 | Lee et al. | 382/125 |
| 6,496,594 B1 * | 12/2002 | Prokoski | 382/118 |
| 6,724,919 B1 * | 4/2004 | Akiyama et al. | 382/118 |
| 6,765,470 B2 * | 7/2004 | Shinzaki | 340/5.52 |
| 6,879,709 B2 * | 4/2005 | Tian et al. | 382/118 |
| 6,882,741 B2 * | 4/2005 | Dobashi et al. | 382/118 |
| 6,938,156 B2 * | 8/2005 | Wheeler et al. | 713/170 |
| 6,957,339 B2 * | 10/2005 | Shinzaki | 713/186 |
| 6,963,659 B2 * | 11/2005 | Tumey et al. | 382/116 |
| 6,993,378 B2 * | 1/2006 | Wiederhold et al. | 382/115 |
| 7,006,672 B2 * | 2/2006 | Sato et al. | 382/118 |
| 7,006,673 B2 * | 2/2006 | Hamid | 340/5.53 |
| 7,020,308 B1 * | 3/2006 | Shinzaki et al. | 382/124 |
| 7,197,168 B2 * | 3/2007 | Russo | 382/125 |
| 2002/0136434 A1 * | 9/2002 | Kuroda et al. | 382/118 |
| 2002/0176610 A1 * | 11/2002 | Okazaki et al. | 382/118 |

* cited by examiner

A01 → REGISTERED DATA NO. 1 ON PERSON A

| RANKING | REGISTERED DATA | SIMILARITY |
|---|---|---|
| 1 | A03 | 0.788 |
| 2 | A05 | 0.755 |
| 3 | A01 | 0.741 |
| 4 | F01 | 0.689 |
| 5 | C07 | 0.565 |
| ⋮ | ⋮ | ⋮ |
| n | B03 | 0.332 |

PERSON A SUCCESSFULLY RECOGNIZED WHEN N = 3

FIG. 4

| RANKING | REGISTERED DATA | SIMILARITY |
|---|---|---|
| 1 | D03 | 0.795 |
| 2 | A02 | 0.767 |
| 3 | A01 | 0.728 |
| 4 | B03 | 0.621 |
| 5 | A04 | 0.598 |
| ⋮ | ⋮ | ⋮ |
| n | C02 | 0.284 |

PERSON A LISTED IN MOST RANKS AND
SUCCESSFULLY RECOGNIZED WHEN N = 5

FIG. 5

| RANKING | REGISTERED DATA | SIMILARITY |
|---|---|---|
| 1 | B01 | 0.717 |
| 2 | A02 | 0.686 |
| 3 | A03 | 0.572 |
| 4 | G02 | 0.614 |
| 5 | A01 | 0.609 |
| ⋮ | ⋮ | ⋮ |
| n | D03 | 0.332 |

PERSON A SUCCESSFULLY RECOGNIZED
WHEN N = 5 AND M = 3

FIG. 6

FACE COLLATION APPARATUS AND BIOMETRICS DATA COLLATION APPARATUS

The application claims priority from a Japanese Application, Patent Application No. 149995/2002, filed May 24, 2002. The contents of which we incorporated herein by reference.

BACKGROUND OF THE INVENTION

1. Field of the Invention

This invention relates to a face collation apparatus for collating and recognizing a person by using face information. More specifically, this invention relates to a face collation apparatus and a biometrics data collation apparatus both of which are capable of accurately identifying a person on the basis of a comprehensive collation result even if part of the data of the collation results of a person approximate the characteristic data of other persons.

2. Description of the Related Art

In general, individual persons have different biometrics data such as faces, fingerprints, voiceprints and irises. In the case of collation of a person by the use of such biometrics data, characteristic data particular to the person which are extracted from raw data acquired during collation are compared with registered characteristic data, and when it is determined that the obtained collation result has a high collation value above a threshold level, the person is identified.

SUMMARY OF THE INVENTION

As understood by those skilled in the art, in the case of extraction of characteristic data on the face of a person, since various kinds of variations such as glasses, variations in expression, posture and illumination environment constitute important collation elements, it is preferable to register characteristic data containing as many variations as possible so that the person can be identified. For this reason, it is the general practice to use a large number of characteristic data per person during collation.

However, if part of the large number of characteristic data on a person, such as glasses, expression, posture and illumination environment, approximate to characteristic data on one of the other persons and even one of the characteristic data on the other person shows a higher collation value than part of the characteristic data on the person himself, the characteristic data on the other person will be recognized as the characteristic data on the person himself, so that a collation error which causes the person to be mistakenly recognized as the other person will occur.

For example, in the case where the person wears glasses, characteristic data on the other person which is common to the glasses is handled as characteristic data on the person, and that characteristic data increases the collation degree of the characteristic data on all other persons and causes collation errors. As described above, the related art has the problem that collation accuracy is decreased by characteristic data on some other persons and collation performance of high reliability cannot be ensured.

Therefore, an object of the invention is to provide a highly-reliable face collation apparatus and biometrics data collation apparatus in both of which when a person is to be identified, even at the time of a collation in which characteristic data on the person approximates to characteristic data on an other person, the characteristic data are comprehensively collated by combination, whereby the person and the other person can be clearly distinguished from each other to reduce collation errors.

To achieve the above object, the invention provides a face collation apparatus for collating a collation target including a face image acquiring unit for acquiring face images, a storage unit in which a plurality of different face images on each of persons who are collation targets are stored in advance in such a manner as to be associated with each of the persons, a calculating unit for calculating collation degree data obtained by comparing the acquired face images with the stored face images, an extracting unit for extracting face images of high collation degrees by a predetermined number from among the calculated collation degree data, and an identifying unit for identifying a person when all face images of the person are contained in results extracted by the extracting unit.

The face image acquiring unit can be made of an image pickup device such as a CCD camera.

The storage unit can be made of a control memory which controls collation devices.

The collation degree data are data for displaying the stored face images in a list form in the order of collation degrees calculated by comparing the acquired face images with the stored face images.

The calculating unit can be made of a control part of a collation device for calculating the collation degree data.

The plurality of effective decisions are a set number of collations effective for a collation decision which are predetermined for identifying the person.

The identifying unit can be made of a control part of a collation device for identifying the person on the basis of the collation results.

According to the invention, characteristic data on a plurality of face images per person are registered in advance, and during a collation of a person, if all the collation results of a plurality of characteristic data on the same person are contained in all the collation results obtained by extracting face images of high collation degrees by a predetermined number from among the collation degree data, all of the collated plurality of characteristic data can be recognized as high collations, whereby the person can be recognized as an identified person.

Accordingly, during collation, even if part of the characteristic data on another person approximates to or is higher in collation value than one of the characteristic data on the person himself, a collation decision is not made on the basis of only that fact, and a comprehensive collation decision is made by collation with a plurality of characteristic data. Accordingly, in the case of the person himself, all the characteristic data indicate high collation values, whereas in the case of the other person, many of the characteristic data indicate low collation values, whereby the person can be clearly distinguished from the other person. Accordingly, during collation, the person is prevented from being mistakenly recognized as the other person, and the reliability of collation is improved to reduce collation errors due to the characteristic data on the other person.

For example, if the person wears glasses, the characteristic data on the person shows a high collation with the characteristic data on another person wearing glasses, but only characteristic data on the glasses show a high collation value and the other characteristic data on the other person greatly differ from those on the person himself and show low collation values. Accordingly, the characteristic data on the person can be clearly distinguished from those on the other person. In particular, all of the plurality of characteristic data on the person himself show high collation values, so that the performance of identification of the person becomes high and the improvement of collation accuracy and the improvement of collation reliability can be realized.

Another aspect of the invention provides a face collation apparatus including a face image acquiring unit for acquiring face images, a storage unit in which a plurality of different face images on each of the persons who are collation targets are stored in advance in such a manner as to be associated with each of the persons, a calculating unit for calculating collation degree data obtained by comparing the acquired face images with the stored face images, an extracting unit for extracting face images of high collation degrees by a predetermined number from among the calculated collation degree data, and an identifying unit for identifying a person when face images of the person have the highest occupation proportion in results extracted by the extracting unit.

According to this construction, during the identification of the person himself, if the largest number of face images of the person are contained in a high collation region corresponding to top ranks of the collation degree data calculated from the collation results, the person can be necessarily identified. Accordingly, merely by checking the occupation proportion of face images of the person in the high collation region, it is possible to determine the identity of the person.

Another aspect of the invention provides a face collation apparatus including a face image acquiring unit for acquiring face images, a storage unit in which a plurality of different face images on each of persons who are collation targets are stored in advance in such a manner as to be associated with each of the persons, a calculating unit for calculating collation degree data by comparing the acquired face images with the stored face images; an extracting unit for extracting face images of high collation degrees by a predetermined number from among the calculated collation degree data, and an identifying unit for identifying a person when face images of the person are contained by a predetermined number in results extracted by the extracting unit.

According to this construction, during the identification of the person, if only the predetermined number of face images of the person are contained in a high collation region corresponding to top ranks of the collation degree data calculated from the collation results, the person can be accurately identified from the number of the recognized collations. In this case as well, merely by checking the number of face images of the person in the high collation region, it is possible to easily determine the identity of the person.

Another aspect of the invention provides a face collation apparatus including a face image acquiring unit for acquiring face images, a storage unit in which a plurality of different face images on each of persons who are collation targets are stored in advance in such a manner as to be associated with each of the persons, a calculating unit for calculating collation degree data by comparing the acquired face images with the stored face images, an extracting unit for extracting face images of high collation degrees by a predetermined number from among the calculated collation degree data, and an identifying unit for identifying a person on the basis of the quantity of face images of the person which are contained in results extracted by the extracting unit.

According to this construction, it is possible to clearly distinguish the person from an other person and accurately identify the person, merely by checking whether all the face images of the person, the largest number of face images of the person or a predetermined number of face images of the person are contained in a high collation region corresponding to top ranks of the collation degree data.

Another aspect of the present invention provides a biometrics data collation apparatus including a biometrics data acquiring unit for acquiring biometrics data, a storage unit in which a plurality of biometrics data on each of the persons who are collation targets are stored in advance in such a manner as to be associated with each of the persons, a calculating unit for calculating collation degree data obtained by comparing the acquired biometrics data with the stored biometrics data, an extracting unit for extracting face images of high collation degrees by a predetermined number from among the calculated collation degree data, and an identifying unit for identifying a person on the basis of the quantity of biometrics data on the person which are contained in results extracted by the extracting unit.

The biometrics data are identification data peculiar to the person himself, such as face information, fingerprint information, voiceprint information and iris information as well as face information on the collation target.

According to this construction, it is possible to use arbitrary biometrics data including the above-described face information, and even with such biometrics data, it is possible to identify the person highly accurately.

In this case as well, a plurality of different characteristic data per person with respect to the same kind of biometrics data are registered in advance, and during collation, if the collation results of a plurality of characteristic data on the same person are listed in top ranks from among the collation results of all characteristic data, all of the collated plurality of characteristic data can be recognized as high collations, whereby the person can be recognized as an identified person.

Accordingly, during collation, even if one of characteristic data on an other person approximates to or is higher in collation value than one of the characteristic data on the person himself, a collation decision is not made on the basis of only that fact, and a comprehensive collation decision is made by collation with a plurality of characteristic data. Accordingly, in the case of the person himself, all the characteristic data indicate high collation values, whereas in the case of the other person, many of the characteristic data indicate low collation values. Accordingly, during collation, the person is prevented from being mistakenly recognized as the other person, and the reliability of collation can be improved to reduce collation errors due to the characteristic data on the other person.

In addition, the biometrics data need not be of the same kind, and may also include a combination of different kinds of biometrics data such as faces and voiceprints. In this case, the accuracy of collation can be improved to a further extent.

BRIEF DESCRIPTION OF THE DRAWINGS

The invention will become more readily appreciated and understood from the following detailed description of a preferred embodiment of the invention when taken in conjunction with the accompanying drawings, in which.

DETAILED DESCRIPTION OF THE INVENTION

A preferred embodiment of the invention will be described below in detail with reference to the accompanying drawings.

Figure 1:
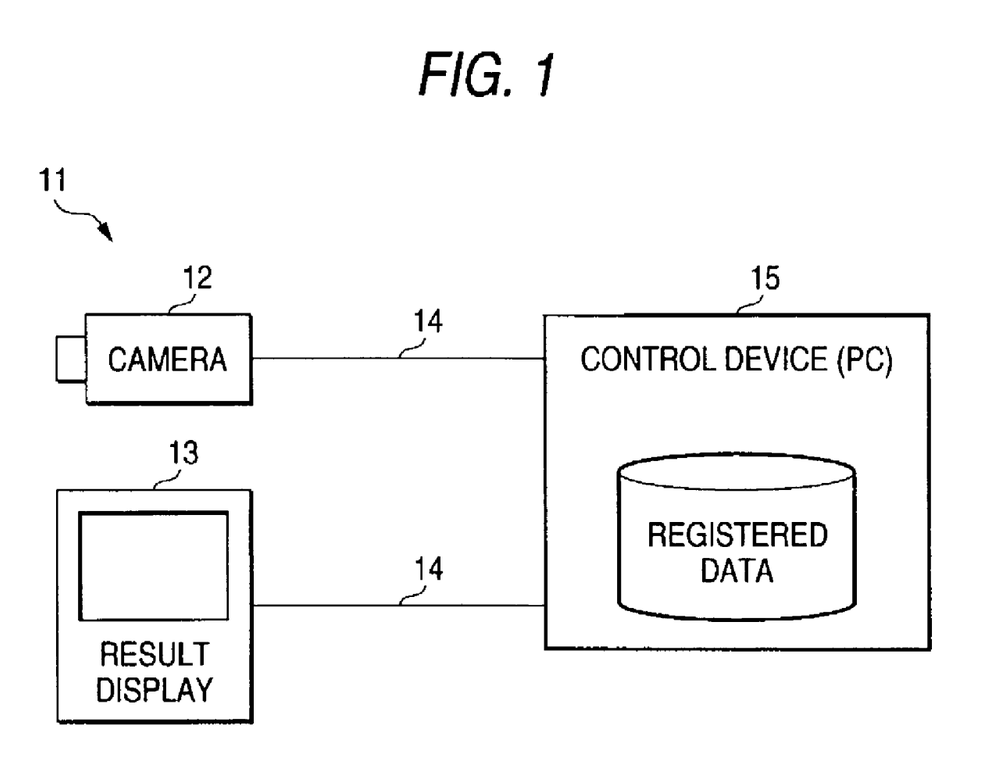
FIG. 1 is a schematic block diagram showing a face collation apparatus according to the invention.

FIG. 1 shows a face collation apparatus 11 which photographs and collates the face of a person. As shown in FIG. 1, in this face collation apparatus 11, a camera 12 and a result display 13 are connected to a control device 15 for collation and control via a connecting cable 14 or by a wireless path. The face collation apparatus 11 is installed, for example, as an authentication unit for a collation target who enters, leaves or uses a room.

The camera 12 is set to photograph the face of a person by using a CCD camera or the like and acquire an image of the face when the person approaches the front of the camera 12. For example, when the camera 12 detects the approach of the person through a person detecting sensor such as a reflection-type infrared sensor (not shown), the camera 12 starts to photograph the person. In addition, the face collation apparatus 11 may also be constructed so that when a collation target himself/herself depresses and operates an operating button or key for starting collation, the face collation apparatus 11 determines that the collation target has made a request for collation, and starts to photograph the person with the camera 12.

The control device 15 analyzes the face image acquired in this manner and starts a collation. At this time, the control device 15, in which the characteristic data for collation of the face images of all collation targets are registered and stored in advance, collates the characteristic data for collation with raw data on the face image which has been actually acquired during the collation, and outputs the collation result indicative of a decision as to identification of the face image to the result display 13 to cause the collation result to be displayed on the result display 13.

The control device 15 can be constructed with, for example, a personal computer. The control device 15 may be installed to perform collation and control in the same installation area as the camera 12, or may also be controlled at a central unit located at a remote position. Furthermore, a plurality of face collation apparatus 11 can also be connected to one control system for collation and control.

Figure 2:
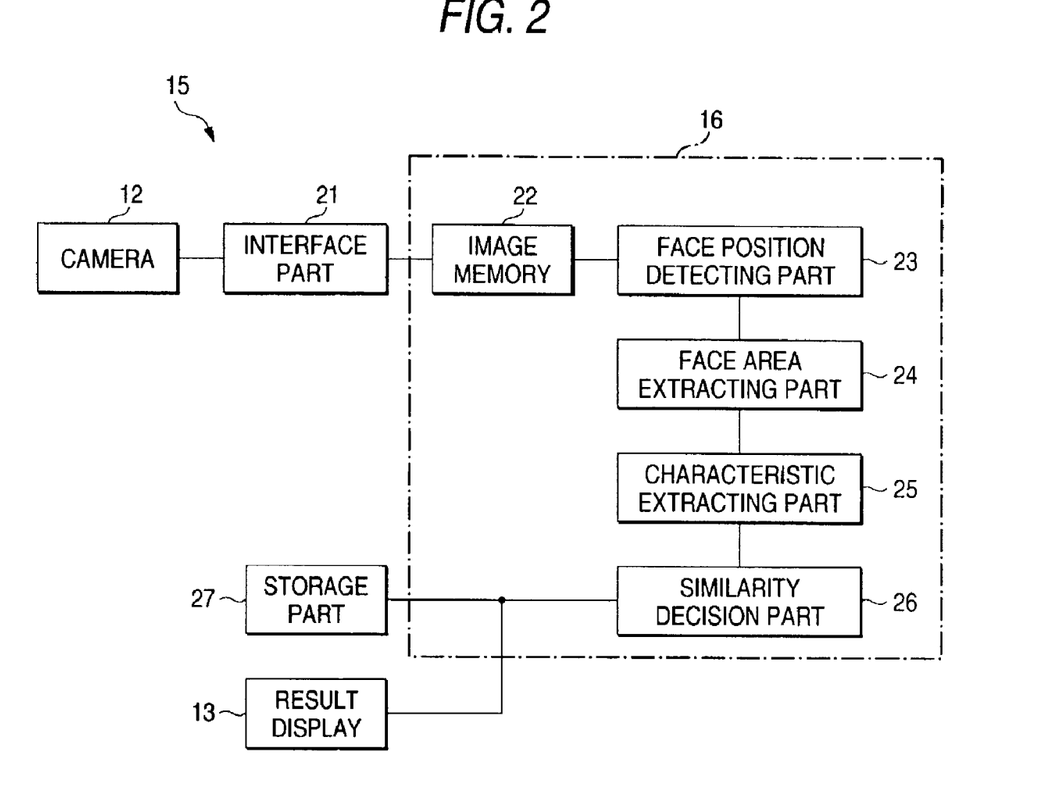
FIG. 2 is a block diagram of a control circuit of the face collation apparatus.

FIG. 2 is a block diagram showing the control circuit of the face collation apparatus 11. The control device 15 which serves as a main control part of the face collation apparatus 11 receives via an I/F (interface) part 21 a raw image containing face information acquired from the camera 12, and temporarily stores the received raw image in an image memory 22.

A face position detecting part 23 accurately detects the position of a face from the stored raw image by matching on the basis of characteristic models of eyes, noses, mouths and the like.

After the face position detecting part 23 detects and determines the position of the face, a face area extracting part 24 extracts a photographed face area.

After the face area extracting part 24 extracts the face area, a characteristic extracting part 25 extracts characteristic data on the face obtained as a set of specific points which has been cut out from the face image. The characteristic data are extracted by obtaining the difference between the face and an average face by the use of a statistic technique such as principal component analysis, or are extracted from gray images such as the eyes, the nose and the mouth of the face by template matching.

A similarity determining part 26 collates the extracted characteristic data with the characteristic data registered and stored in the storage part 27 in advance for the purpose of collation decision, and determines the similarity of the extracted characteristic data and the stored characteristic data, and the result display 13 displays the decision result. The face collation apparatus 11 has the above-described collation construction.

Face images associated with all collation targets are stored as the characteristic data registered in advance. The face images include face images representative of various expressions of each of the collation targets, as well as face images representative of a plurality of faces of each of the collation targets which are respectively turned in different directions at different arbitrary angles, such as an upward-turning face, a downward-turning face and a sideways-turning face. The accuracy of collation is enhanced by using a plurality of face images of the same person during a collation decision.

In the case of a collation decision as to each of the persons, since characteristic data on a plurality of face images per person are registered and stored in the storage part 27 in advance, characteristic data on a plurality of face images of the same person which are actually acquired from the camera 12 during collection are collated with the stored characteristic data, and if a plurality of collation results are contained in a top rank region from among all collation results, the collated plurality of characteristic data can be recognized as high collation values, respectively, whereby the person can be identified.

Figure 3:
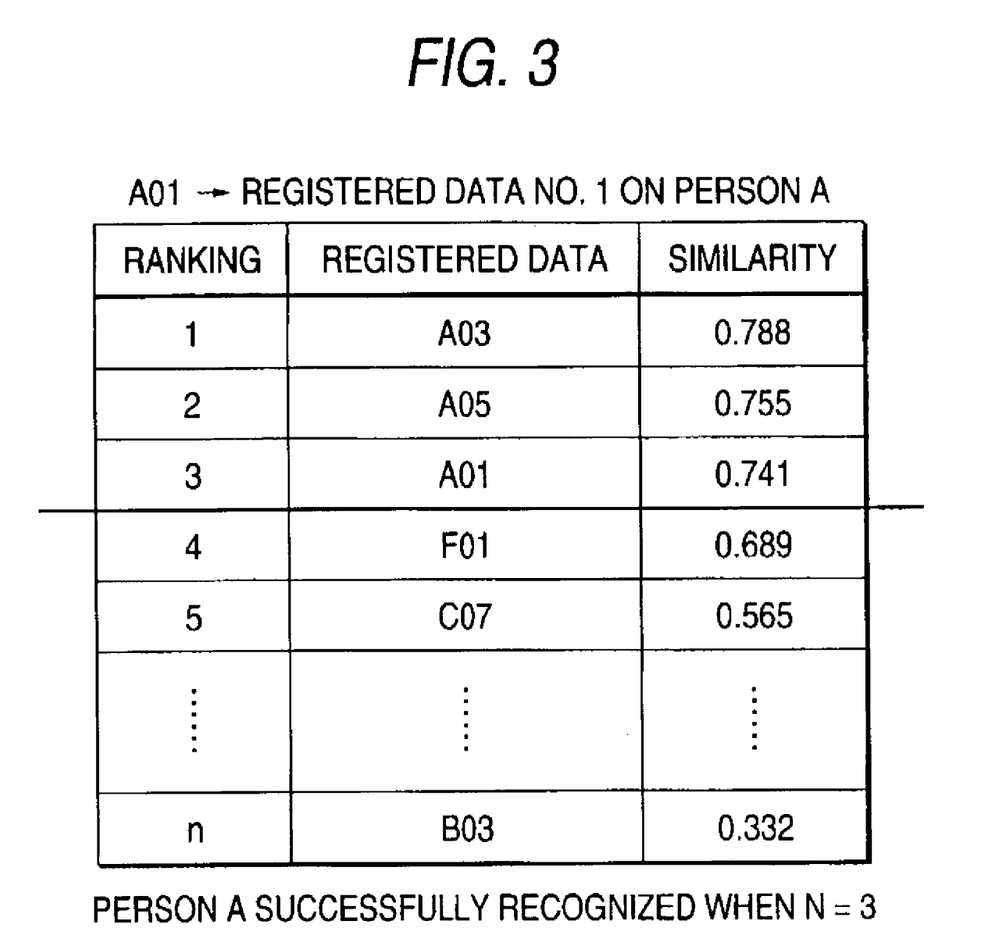
FIG. 3 is a table showing similarity list data of a first recognition success condition pattern.

As shown in FIG. 3 by way of example, during collation, a plurality of face images of the same person are acquired from the camera 12, and characteristic data on the plurality of face images are compared with the characteristic data on all the face images stored in the storage part 27 in advance, whereby similarities are found to create similarity list data.

This similarity list data includes three items, i.e., ranking representative of similarities arranged in order from highest to lowest, registration data representative of registered persons and kinds associated therewith, and similarity representative of similarity decision results. Referring to numerical values listed in the registration data, for example, "A01" represents "registered data No. 01 on a person A".

For these similarity list data, a first recognition success condition pattern is determined so that if N top-ranked similarities equal or greater than a threshold level represent the same person, the person is recognized as an identified person. Referring to FIG. 3, all three collation results in ranks 1-3 as to a plurality of data acquired from face images of the person A are ranked in a high similarity region above the threshold and satisfy the required collation conditions, whereby the person A is successfully recognized. In this manner, a plurality of different face images of a person are collated and checked, and if all the obtained similarities are contained in the high similarity region, the person is identified.

Accordingly, during collation, even if one of characteristic data on one of the other persons approximates to or is higher in collation value than one of characteristic data on the person himself, a collation decision is not made on the basis of only that fact, and a comprehensive collation decision is made by collation with a plurality of characteristic data. Accordingly, in the case of the person himself, all the characteristic data indicate sufficiently high values of equal or greater than the threshold level, whereas in the case of the other person, many of the characteristic data indicate low collation values below the threshold level, whereby the person can be clearly distinguished from the other person. Accordingly, during collation, the person is prevented from being mistakenly recognized as the other person, and the reliability of collation is improved.

For example, if the person wears glasses, the characteristic data on the person shows a high collation with the characteristic data of one of the other persons wearing glasses of the same or similar shape, but characteristic data on only the glasses show a similarity of equal or greater than the threshold level and the other characteristic data on the other person show low collation values indicative of low similarities and greatly differ from those on the person himself. Accordingly, the characteristic data on the person can be clearly distinguished from those on the other person. In particular, all of the plurality of characteristic data on the person himself show high collation values indicative of high similarities, so that the performance of identification of the person becomes high and the improvement of collation accuracy and the improvement of collation reliability can be realized.

Figure 4:
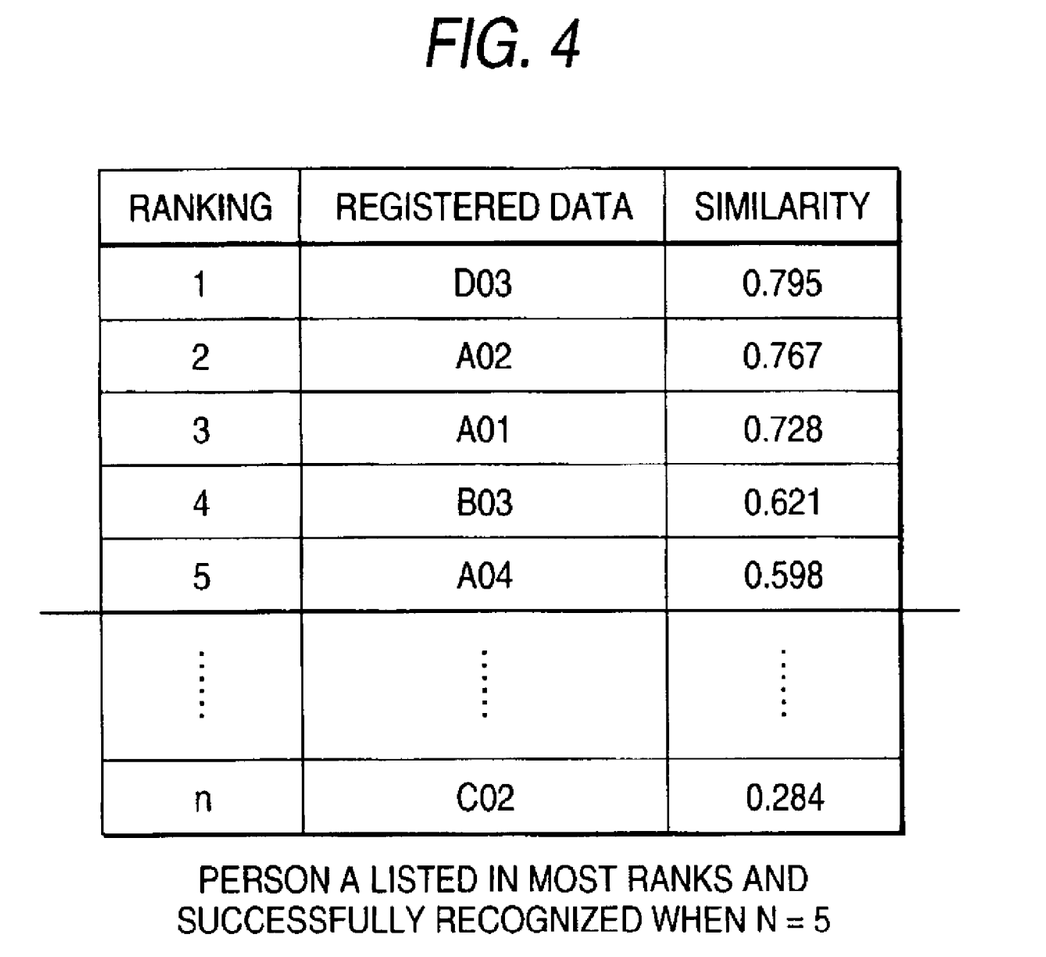
FIG. 4 is a table showing similarity list data of a second recognition success condition pattern.

FIG. 4 shows a second recognition success condition pattern. According to the second recognition success condition pattern, in similarity list data, if face images of the same person is the highest occupation proportion in N top ranks equal or greater than the threshold level, the person is recognized as an identified person.

For example, in top ranks 1 to 5 above the threshold level, the collation results as to a plurality of characteristic data acquired from face images of the person A show that the largest number of (three) characteristic data on the person A are ranked in a high similarity region equal or greater than the threshold level. Accordingly, the person A is successfully recognized. In this manner, a plurality of different face images of a person are collated and checked, and if characteristic data on the person have the highest occupation proportion in the high similarity region equal or greater than the threshold level, the person is identified.

In the case of this setting condition, during the identification of the person, if the largest number of face images of the person are listed in top ranks of similarity list data calculated from the collation results, the person can be necessarily identified. Accordingly, merely by checking the occupation proportion of face images of the person in top ranks equal or greater the threshold level, it is possible to easily determine the identity of the person.

Figure 5:
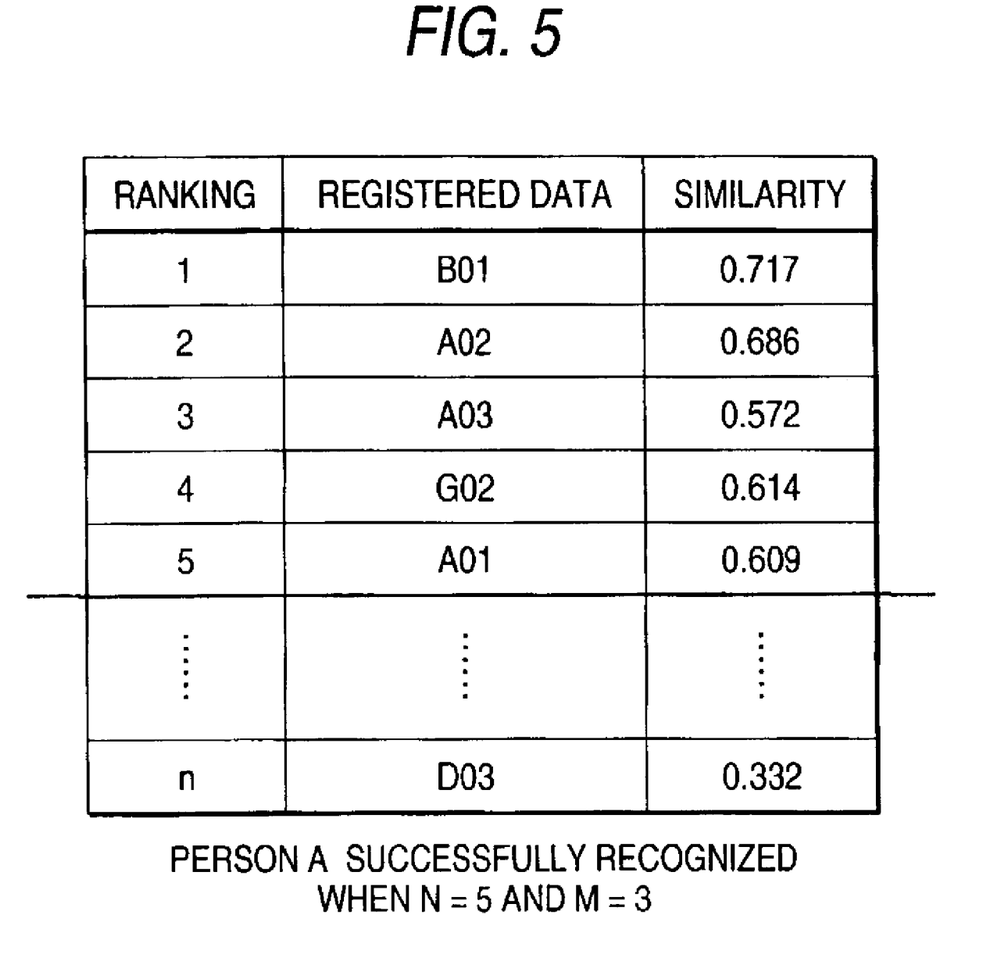
FIG. 5 is a table showing similarity list data of a third recognition success condition pattern.

FIG. 5 shows a third recognition success condition pattern. According to the third recognition success condition pattern, in similarity list data, if at least M characteristic data on the same person are listed in N top ranks equal or greater than the threshold level, the person is recognized as an identified person.

For example, when M≧3, in top ranks 1 to 5 equal or greater than the threshold level, the collation results as to a plurality of characteristic data acquired from face images of the person A show that at least three characteristic data on the person A are ranked in a high similarity region equal or greater than the threshold level and satisfy the required collation conditions, whereby the person A is successfully recognized. In this manner, a plurality of different face images of a person are collated and checked, and if only a predetermined number of face images are contained in the high similarity region equal or greater than the threshold level, the person is identified.

In the case of this setting condition, during the identification of the person, if only the predetermined number of face images of the person are listed in top ranks of similarity list data calculated from the collation results, the person can be clearly distinguished from one of the other persons and can be accurately identified. In this case as well, merely by checking the number of face images of the person in the high similarity region equal or greater than the threshold level, it is possible to easily determine the identity of the person.

Figure 6:
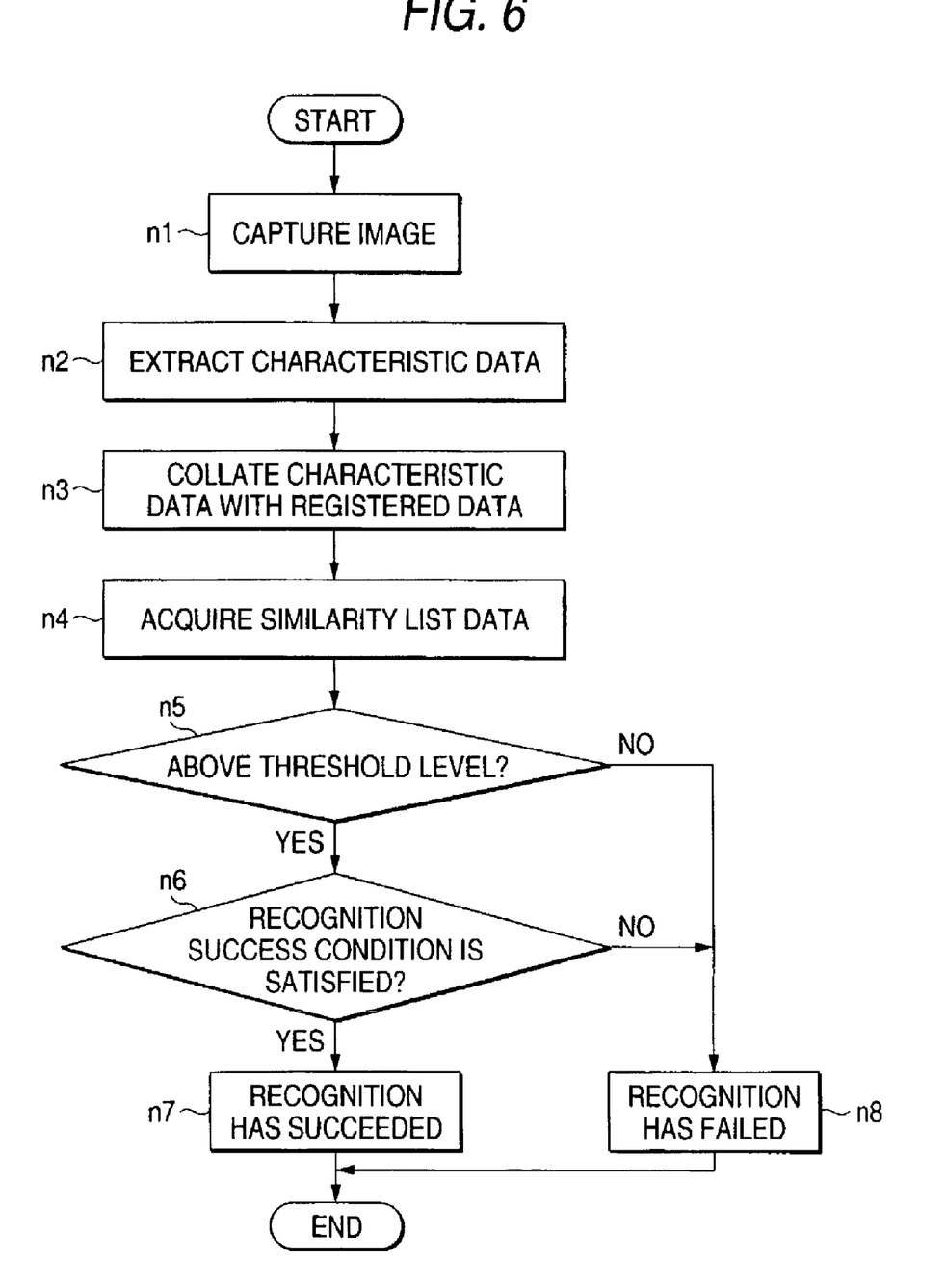
FIG. 6 is a flowchart showing the collation processing operation of the face collation apparatus.

A collation processing operation of the face collation apparatus 11 constructed in this manner will be described below with reference to the flowchart of FIG. 6.

When a person comes to the front of the camera 12, the camera 12 photographs the face of the person, and raw data on photographed face images are acquired by image capture and are stored in an image memory 22 (Step n1).

In the case where the raw data of the face images are acquired, face areas are retrieved from the raw data to detect photographed face areas. After the face areas have been detected, the positions of faces are detected and determined from characteristics data such as eyes, noses and mouths, and then characteristic data on the faces are extracted from the face images (Step n2).

The extracted characteristic data on the faces are collated with previously registered characteristic data on the faces to find similarities (Step n3), and on the basis of the results of collations of the found similarities, similarity list data (refer to FIGS. 3 to 5) containing similarities arranged in order from highest to lowest are created (Step n4).

In the similarity list data, it is determined whether the characteristic data on the person himself exist in a high similarity region equal or greater than a predetermined threshold level as the results of collations (Step n5).

If the characteristic data exist in the high similarity region equal or greater than the predetermined threshold level and satisfy a predetermined recognition success condition (Step n6), it is determined that the recognition of the person has succeeded, whereby the person is identified highly accurately (Step n7).

However, if, as the results of collations, the characteristic data on the person are ranked below the predetermined threshold level or a sufficient number of characteristic data on the person are not ranked equal or greater than the predetermined threshold level, the person is not identified and is recognized as an other person (Step n8).

As described above, characteristic data on a plurality of face images per person are registered in advance, and during collation, if the collation results of a plurality of characteristic data on the same person are listed in top ranks from among the collation results of all characteristic data, all of the collated plurality of characteristic data can be recognized as high collations, whereby the person can be recognized as an identified person. In particular, during collation, even if one of characteristic data on one of the other persons approximates to or is higher in collation value than one of characteristic data on the person himself, a collation decision is not made on the basis of only that fact, and a comprehensive collation decision is made by collation with a plurality of characteristic data. Accordingly, in the case of the person himself, all the characteristic data indicate high collation values, whereas in the case of the other person, many of the characteristic data indicate low collation values. Accordingly, accurate collation decision results can be obtained, and the person can be clearly distinguished from the other person.

The construction of the invention corresponds to the construction of the above-described embodiment in the following manner:

the face image acquiring unit in the invention corresponds to the camera 12 in the embodiment;

the storage unit in the invention corresponds to the storage part 27 in the embodiment;

the collation degree data in the invention corresponds to the similarity list data in the embodiment;

the calculating unit and the identifying unit in the invention correspond to the similarity decision part 26 in the embodiment;

the predetermined number in the invention corresponds to a predetermined numerical value (top ranks) in the high similarity region equal or greater than the threshold level in the embodiment; and the biometrics data collation apparatus according to the invention corresponds to the face collation apparatus 11, but the invention can be applied on the basis of technical ideas disclosed in the appended claims, and is not to be construed to be limited to only the construction of the above-described embodiment.

For example, although the above description of the embodiment has referred to one example of collation which uses face images as biometrics data, the invention is not limited to this example and can also provide a similar construction using voiceprints or other biometrics data.

According to the invention, all characteristic data on a person himself show high collation values, whereas characteristic data on one of the other persons generally show low collation values, whereby the characteristic data on the person himself can be clearly distinguished from the characteristic data on the other person and the person can be identified. Accordingly, during collation, the person is prevented from being mistakenly recognized as the other person, and the reliability of collation is improved to reduce collation errors due to the characteristic data on the other person.

What is claimed is:

1. A biometrics data collation apparatus comprising:
   a biometrics data acquiring unit for acquiring biometrics data of a person to be identified;
   a storage unit in which a plurality of biometrics data for each person of a plurality of persons who are collation targets are stored in advance in such a manner as to be associated with an identity of each person of said plurality of persons;
   a calculating unit for calculating collation degree data obtained by comparing the acquired biometrics data of said person to be identified with the stored biometrics data;
   an extracting unit for extracting a predetermined number of the highest collation degree data from the stored calculated collation degree data; and
   an identifying unit responsive to said extracting unit for matching the acquired biometrics data of said person to be identified with an identity based on a predetermined condition relating to the quantity of biometric data of the person to be identified which are contained in results extracted by the extracting unit.

2. The biometrics data collection apparatus according to claim 1, wherein the biometrics data acquired is data characterizing a face.

3. The biometrics data collection apparatus according to claim 2, wherein the biometrics data acquiring unit comprises a camera.

4. The biometrics data collection apparatus according to claim 2, wherein the storage unit, calculating unit, extracting unit, and identifying unit are part of a personal computer.

5. The biometrics data collection apparatus according to claim 1, wherein the predetermined condition is such that the identifying unit matches the acquired biometric data of said person to be identified with an identity when a plurality of biometric data of said person to be identified are contained in results extracted by the extracting unit.

6. The biometrics data collection apparatus of claim 1, wherein the predetermined condition is such that the identifying unit matches the acquired biometric data of said person to be identified with an identity when all of the stored biometric data of said person to be identified are contained in results extracted by the extracting unit.

7. The biometric data collection apparatus of claim 1, wherein the predetermined condition is such that the identifying unit matches the acquired biometric data of said person to be identified with an identity when the stored biometric data of said person to be identified have the highest occupation proportion in results extracted by the extracting unit.

8. The biometric data collection apparatus of claim 1, wherein the predetermined condition is such that the identifying unit matches the acquired biometric data of said person to be identified with an identity when a predetermined number of stored biometric data of said person to be identified are contained in results extracted by the extracting unit.

9. The biometrics data collation apparatus of claim 1,
   wherein the acquired biometrics data comprises face images of the person to be identified and the biometrics data acquiring unit comprises a face image acquiring unit for acquiring face images of the person to be identified,
   wherein the stored biometrics data comprises a plurality of face images and the storage unit comprises a face image storage unit in which a plurality of different face images for each person of a plurality of persons who are collation targets are stored in advance in such a manner as to be associated with an identity of each person of said plurality of persons,
   wherein the calculating unit comprises a face image calculating unit for calculating collation degree data obtained by comparing the acquired face images of said person to be identified with the stored face images, and
   wherein the identifying unit comprises a face image identifying unit responsive to said extracting unit for matching the acquired face images of said person to be identified with an identity based on a predetermined condition relating to the quantity of face images of the person to be identified which are contained in results extracted by the extracting unit.

10. The biometrics data collation apparatus of claim 9, wherein the predetermined condition is such that the face image identifying unit matches the acquired face images of said person to be identified with an identity when a plurality of stored face images of said person to be identified are contained in results extracted by the extracting unit.

11. The biometrics data collation apparatus of claim 9, wherein the predetermined condition is such that the face image identifying unit matches the acquired face images of said person to be identified with an identity when all of the stored face images of said person to be identified are contained in results extracted by the extracting unit.

12. The biometrics data collation apparatus of claim 9, wherein the predetermined condition is such that the face image identifying unit matches the acquired face images of said person to be identified with an identity when the stored face images of said person to be identified have the highest occupation proportion in results extracted by the extracting unit.

13. The biometrics data collation apparatus of claim 9, wherein the predetermined condition is such that the face image identifying unit matches the acquired face images of said person to be identified with an identity when a predetermined number of stored face images of said person to be identified are contained in results extracted by the extracting unit.

* * * * *